March 3, 1936.  R. N. ROWE  2,032,769
SOLDERLESS WIRE CONNECTION
Filed Aug. 7, 1933
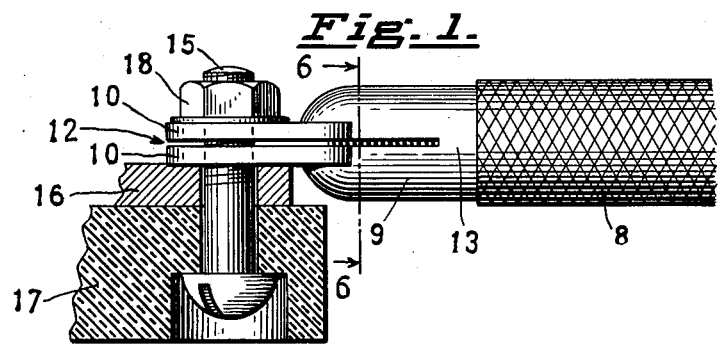
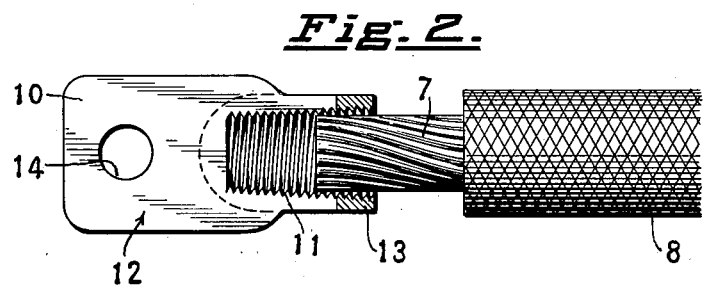
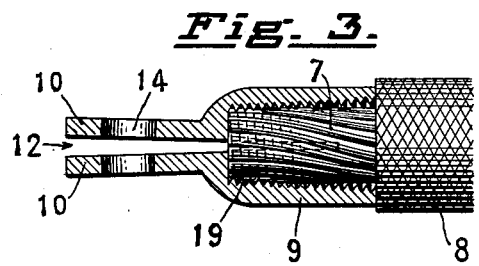
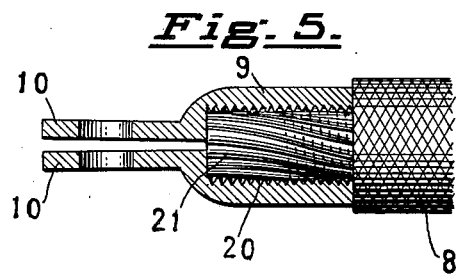
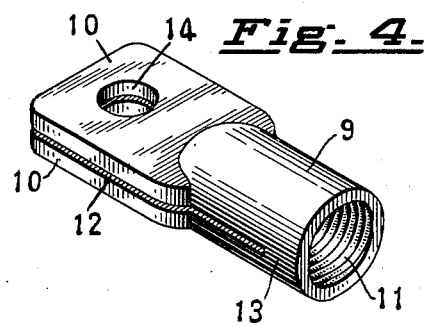
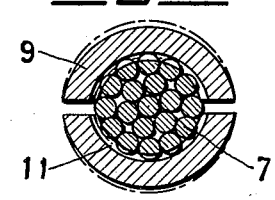
INVENTOR
RAYMOND N. ROWE,
BY
ATTORNEY Patented Mar. 3, 1936

2,032,769

UNITED STATES PATENT OFFICE 2,032,769

SOLDERLESS WIRE CONNECTION

Raymond N. Rowe, Plainville, Conn., assignor to The Trumbull Electric Manufacturing Company, Plainville, Conn., a corporation of Connecticut Application August 7, 1933, Serial No. 683,943

1 Claim. (Cl. 173—269)

My invention relates to connector means and particularly to the form of electrical terminals which are commonly known to the trade as wire lugs.

The main object of my invention is to provide a simple and inexpensive but effective lug construction to which the end of a wire may be secured without the use of solder.

Another object is to provide a construction of this character which may be readily and securely attached to an electric wire or cable.

Another object is to provide a construction of this kind which may be readily disconnected from a wire or cable if so desired.

A special object is to provide a construction in which the wire may be securely anchored to the lug and the lug may be clamped to the terminal of a switch or other electrical device.

Another object is to provide a type of solderless lug or connector which may be firmly secured in position by threading or screwing it on to the end of the wire or cable and to provide clamping means in addition to the threading means.

In carrying out the invention I preferably form the connector of a single piece of metal having a body portion for attachment to a switch terminal or the like and a socket portion for receiving the end of a wire or cable.

The body portion has two extension lugs which are spaced slightly apart from each other in parallel relation and the body of the socket portion is partially slotted lengthwise so that in effect two spaced apart jaws are provided. These extension lugs are perforated for mounting the lug on a device terminal by means of a screw or bolt and a nut which makes it possible to force the lugs together and clamp the wire in the socket portion. The socket is interiorly provided with roughened portions preferably in the form of a tapered screw thread which is adapted to be threaded or screwed on to the end of the wire or cable so as to provide a positive anchorage for the wire in addition to the vise-like clamping of the wire in the slotted end of the lug.

Fig. 1 is a side view of the terminal involving my invention mounted on a support which is shown in section.

Fig. 2 is a longitudinal sectional view of the connector showing the method of applying it to a wire.

Fig. 3 is a longitudinal sectional view showing the connector applied to the end of the wire or cable but separate from the support and with the terminal ends of the lug forced apart in angular relation by the forced insertion of the cable into the lug.

Fig. 4 is a perspective view of a connector embodying my invention.

Fig. 5 is a view similar to Fig. 3 of a modification.

Fig. 6 is a section on the line 6—6 of Fig. 1.

I have shown a wire or cable end 7 of the multiple strand type provided with an insulating cover 8 but it will be understood that the invention relates to the connector rather than to the wire per se.

The connector is preferably formed of a single piece of metal having a socket portion 9 and two spaced extension lugs 10, 10. The inside of the body is preferably provided with tapered screw threads 11 which constitute teeth helically arranged for screwing on to the end of the wire and simultaneously cutting or forming a like thread on to the end of the relatively soft wire or cable.

The two lugs 10, 10 are spaced apart from each other by a slot 12 which extends partway of the length of the socket leaving a continuous annular wire receiving opening 13 so that the rear end of the socket portion and the extension lugs form a pair of jaws which are adapted to be forced together so as to grip or clamp the end of the wire.

The lugs 10, 10 are provided with holes 14 adapted to receive an attaching screw or bolt 15 by means of which the lug or connector is adapted to be secured to a bus bar, a switch terminal 16, or other like electrical connection, the latter usually being mounted on an insulating block or panel 17. A nut 18 is mounted on the end of the bolt 15 to secure the parts in place.

The thread in the socket portion 11 is preferably tapered so that the lug can be readily screwed on to the end of the wire 7, the teeth of the threads biting into the softer metal of the wire as shown in Fig. 3, and the slots in the lug assisting in the mechanical action similar to that of a threading die.

To apply the lug or connector it is merely necessary to insert the end of the wire 7 into the socket and screw the lug on to the wire until it seats in the position shown in Fig. 3. This action tends to force the free ends of the jaws apart in an angular direction. When the lug is then positioned on the screw or bolt 15 and the nut 18 is tightened, the spread lugs are drawn together into parallel relation and the jaw portions 19 tightly grip the end of the wire so that it is impossible to pull the wire out of the lug with any ordinary force. An effective electrical and mechanical connection is thus provided without the use of solder.

The clamping action of the slotted end of the socket also has a locking effect on the cable which is illustrated in Fig. 6, where it will be noted that the internal transverse contour of the socket is forced from a true circle to an ellipse, due to the clamping action of the bolt, thereby preventing the turning of the cable or wire end within the socket.

In the form shown in Fig. 5 the threaded portion 20 of the socket is shown of a uniform diameter and in this case the end of the wire 21 has been tapered for the purpose of facilitating its insertion into the socket. This construction, it will be understood, is intended to be mounted on an attaching screw or bolt as previously described, in which event the lugs 10, 10 are adapted to be drawn together so as to securely clamp the end of the wire.

From the foregoing it will be clear that I have provided a means for threading a wire lug onto the end of a wire or cable without the use of dies or threading tools and have also provided further means for clamping the lug and the wire into both mechanical and electrical engagement.

I claim:

A one-piece solderless wire terminal having a contact foot portion adapted to be seated upon a suitable correlated terminal and a projecting tubular portion adapted to receive one end of an electric cable, said contact foot portion and the major part of the projecting tubular portion being slotted with a continuous slot and said tubular portion being interiorly threaded with a tapered thread by means of which the entrance of a cable into the tubular portion of the terminal will cause the opposite sides of the foot portion to open as the wire is forced into position and a clamping means for closing said slotted portions into engagement with the cable and also securing said terminal in operative position.

RAYMOND N. ROWE.